(12) United States Patent
Maddalozzo, Jr. et al.

(10) Patent No.: US 6,401,215 B1
(45) Date of Patent: Jun. 4, 2002

(54) RESYNCHRONIZATION OF MIRRORED LOGICAL DATA VOLUMES SUBSEQUENT TO A FAILURE IN DATA PROCESSOR STORAGE SYSTEMS WITH ACCESS TO PHYSICAL VOLUME FROM MULTI-INITIATORS AT A PLURALITY OF NODES

(75) Inventors: John Maddalozzo, Jr.; Gerald Francis McBrearty; Johnny Meng-Han Shieh, all of Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/325,395

(22) Filed: Jun. 3, 1999

(51) Int. Cl.[7] ............................................. H02H 3/05
(52) U.S. Cl. ........................................................ 714/6
(58) Field of Search ........................... 714/6, 4, 7, 18, 714/20; 711/114, 153, 162, 173; 707/201, 202; 709/213–216; 307/503

(56) References Cited

U.S. PATENT DOCUMENTS

| | | | | |
|---|---|---|---|---|
| 4,993,030 A | * | 2/1991 | Krakauer et al. | 714/6 |
| 5,129,088 A | * | 7/1992 | Auslander et al. | 711/1 |
| 5,488,731 A | * | 1/1996 | Mendelsohn | 711/114 |
| 5,644,696 A | * | 7/1997 | Pearson et al. | 714/6 |
| 5,673,382 A | * | 9/1997 | Cannon et al. | 707/202 |
| 5,748,882 A | * | 5/1998 | Huang | 709/224 |
| 5,758,342 A | * | 5/1998 | Gregerson | 707/10 |
| 5,805,785 A | * | 9/1998 | Dias et al. | 714/20 |
| 5,889,935 A | * | 3/1999 | Ofek et al. | 709/217 |
| 5,897,661 A | * | 4/1999 | Baranovsky et al. | 707/205 |
| 5,983,316 A | * | 11/1999 | Norwood | 711/111 |
| 6,047,294 A | * | 4/2000 | Deshayes et al. | 707/202 |
| 6,173,413 B1 | * | 1/2001 | Slaughter et al. | 707/202 |

* cited by examiner

Primary Examiner—Robert Beausoleil
Assistant Examiner—Yolanda L. Wilson
(74) Attorney, Agent, or Firm—Julius B. Kraft; Volel Emile

(57) ABSTRACT

There is provided a system for dynamically resynchronizing, in the even of a system failure, a storage system made up of a plurality of nodes, each which has mirrored logical volumes respectively divided in to a plurality of mirrored logical data partitions. Each of these nodes has the means for accessing a common physical data volume, e.g. a disk drive in which data in corresponding logical volumes at respective nodes is represented by data stored in common in the physical volume. System recovery at the plurality of nodes after a failure at one of the nodes is carried out by commencing the sequential resynchronization of a logical data volume at a nonfailure node to thereby sequentially resynchronize the partitions of the physical data volume representative of the logical data volume, and indicating as resynchronized those portions of the logical data volume at the failure node represented by said resynchronized partitions of the physical data volume.

15 Claims, 5 Drawing Sheets

RESYNCHRONIZATION OF MIRRORED LOGICAL DATA VOLUMES SUBSEQUENT TO A FAILURE IN DATA PROCESSOR STORAGE SYSTEMS WITH ACCESS TO PHYSICAL VOLUME FROM MULTI-INITIATORS AT A PLURALITY OF NODES

CROSS-REFERENCE TO RELATED COPENDING PATENT APPLICATIONS

The following patent application, having the same inventors and the same assignee as the present invention and filed concurrently herewith, covers subject matter related to the subject matter of the present invention: "DATA PROCESSOR STORAGE SYSTEMS WITH DYNAMIC RESYNCHRONIZATION OF MIRRORED LOGICAL DATA VOLUMES SUBSEQUENT TO A STORAGE SYSTEM FAILURE"Ser. No. 09/325,405.

1. Technical Field

The present invention is directed to methods and programs for computer storage systems conventionally implemented in disk drive storage and, more particularly, to stored data recovery by resynchronization of stored mirrored logical data volumes after failures in storage systems where the physical volume (PV) is accessed or used by multi-initiators, i.e. a plurality of independently operated data processors.

2. Background of Related Art

In the current data processing environment, there has been a dramatic increase in the availability and capacity of computer storage systems, such as hard disk drives and optical drives. Present storage systems associated with workstations may have conventional capacities up to hundreds of gigabytes. However, because of these increased capacities, problems have arisen in storage system recovery after a system failure or like problem. This is particularly the case in storage systems which use mirrored stored logical data volumes. Mirroring is the implementation where the operating system makes a plurality of copies of data (usually duplicate or triplicate copies) in order to make data recovery easier in the event of a system failure or like problem. However, all mirrored storage systems require a system resynchronization after a failure. This will resynchronize all noncurrent PV partitions used in the mirroring to represent the logical volume partitions of the logical volume group.

By way of background, most AIX™ and UNIX™ based operating systems use some form of stored data mirroring. A basic storage system may be considered to be a hierarchy managed by a logical volume manager and made up of logical volume groups, which are, in turn, made up of a plurality of logical volumes which are physically represented by PVs on the actual disk or hard drive. Each PV is divided into physical partitions (PPs), which are equal size segments on a disk, i.e. the actual units of space allocation. Data on logical volumes appears to be contiguous to the user, but can be noncontiguous on the PV. This allows file systems and other logical volumes to be resized and relocated, span multiple PVs and have their contents replicated for greater flexibility and availability in the storage of data. In mirrored systems, a logical volume is divided into a plurality of mirrored logical data partitions, i.e. each logical volume has two or three redundant partitions therein. Such logical and PVs are generally described in the text, *AIX 6000 System Guide*, Frank Cervone, McGraw-Hill, New York, 1996, pp. 53–56.

In any event, when mirrored logical volumes (LVs) are first brought on-line or initiated, they must be synchronized. In mirrored LVs, each partition of the mirror can have two states: stale or available (unstale). Data may be read from any unstale mirrored partition. On the other hand, in writing, the data must be written to all available (unstale) mirrored partitions before returning. Only partitions that are marked as unstale will be read and written to. In synchronization or in resynchronization, a command such as the AIX "syncvg" command is run which copies information from an unstale mirror partition to the stale mirror partition, and changes the partition designation from stale to unstale.

In systems with mirrored partitions, after a system failure, e.g. a hangup or crash, the LVs must be resynchronized. In current practice, this resynchronization must take place before the storage system may be accessed again; otherwise, the user may get inconsistent data. This is likely to result from "writes" in flight, i.e. data in the process of being written into specific partitions in LVs at the time of the crash which may not be completed and which may cause mirrored partitions to have different data. Reference is made to section 6.2.7 on pp. 163–164 of the above Cervone text. Such resynchronization is usually done sequentially LV by LV. and partition by partition. Because of the increased size of current storage systems and the large size groups of logical data volumes which may be involved in a resynchronization after a storage system failure, users pay be subject to undesirable delays while waiting for the completion of synchronization in order to access data from storage systems using mirrored volumes.

The above cross-referenced patent application, "DATA PROCESSOR STORAGE SYSTEMS WITH DYNAMIC RESYNCHRONIZATION OF MIRRORED LOGICAL DATA VOLUMES SUBSEQUENT TO A STORAGE SYSTEM FAILURE", which is hereby incorporated by reference, offers a solution to this problem. It provides a system for dynamically resynchronizing in the event of a storage system failure. Immediately after the correction of the problem causing the failure, the resynchronization of the plurality of LVs is commenced, but without waiting for the resynchronization to be completed, data is accessed from a data partition in a portion of one of said LVs. Then, there are means for determining whether the portion of the LV containing the accessed partition has already been resynchronized prior to access, together with means responsive to these determining means for replacing data in the other mirrored partitions corresponding to the accessed data with the accessed data in said accessed partition in the event that the LV has not been resynchronized.

While this approach is very effective where the physical storage system, i.e. the physical data volume is accessed by only a single data processor, additional problems arise when the PV is accessed by multi-initiators, i.e. more than one independent data processor. Since the partitions in the PVs are shared by logical volumes on different initiators through their respective nodes, the resynchronizing effects of the LVs at these different nodes must be considered during the resynchronization.

SUMMARY OF THE PRESENT INVENTION

The present invention covers accessing a physical data volume through a plurality of independent data processors at a plurality of nodes. Each node has at least one logical data volume comprising mirrored data corresponding to a logical data volume comprising mirrored data at each of the other nodes. Also, data in such corresponding LVs is represented by data stored in common partitions in said PV. When a storage failure occurs at any of the nodes, there is resynchronization of the logical data volumes of each of the nodes comprising commencing the sequential resynchronization of a logical data volume at a nonfailure node to thereby sequentially resynchronize the partitions of the physical data volume representative of said logical data volume, and indicating as resynchronized those portions of the logical data volume at said failure node represented by the resynchronized partitions of said physical data volume.

Usually, each of the logical data volumes comprises a plurality of partitions of mirrored data respectively represented by said physical data volume partitions. Logical data volumes of said nodes may be open or closed and only open logical data volumes are resynchronized. In the effective operation of the system, the commencing of the sequential resynchronization of a logical data volume at the failure node is subsequent to the commencing of the sequential resynchronization of the logical data volume at the nonfailure node. Best results are achieved with means responsive to said failure for setting resynchronization indicators for the LV at the failure node and for the corresponding logical volumes at the nonfailure nodes in combination with means for removing said resychronization indicator from the partitions of the logical data volume at said failure node represented by said resynchronized partitions of said physical data volume.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
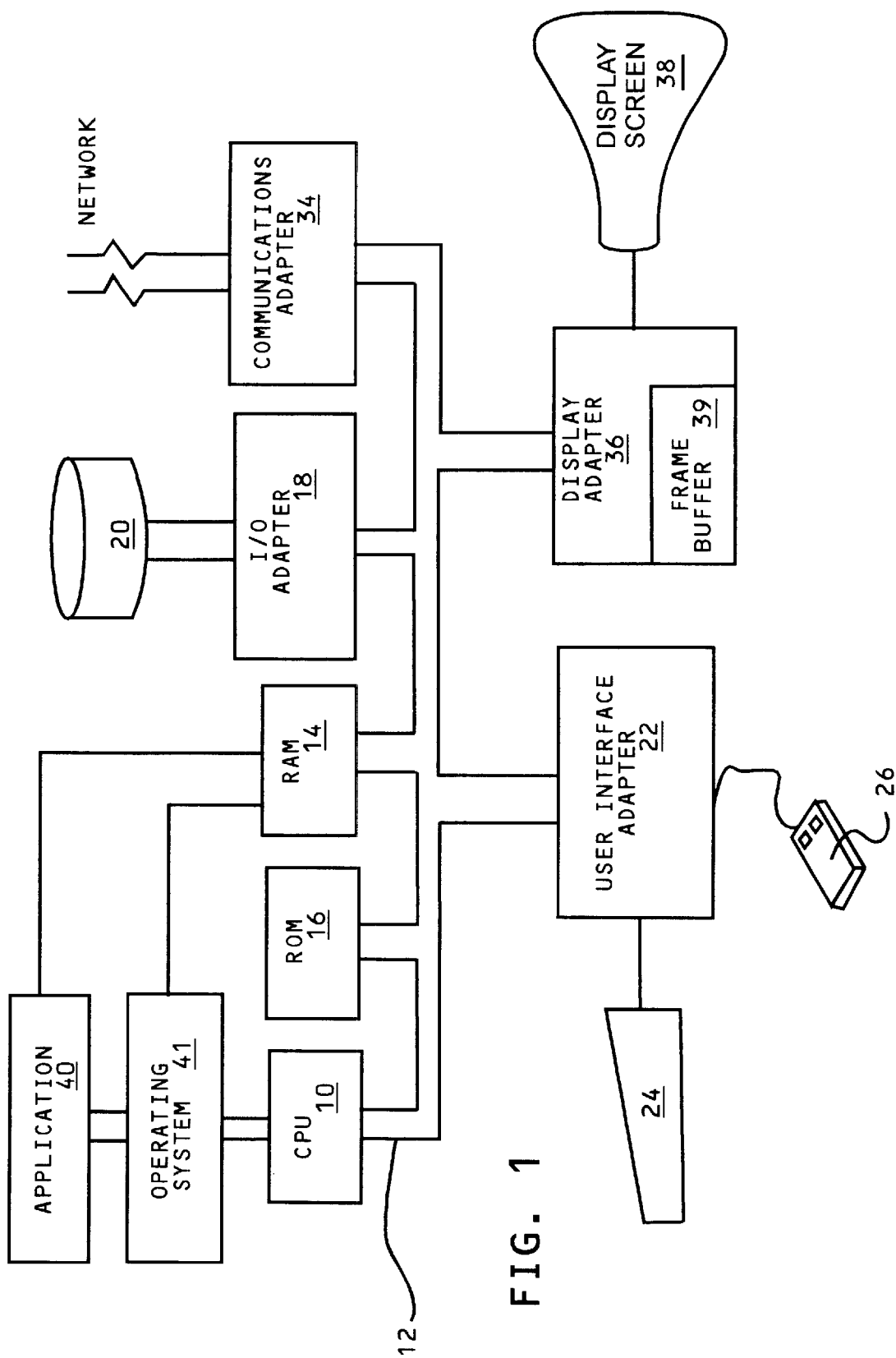
FIG. 1 is a block diagram of a data processing system including a central processing unit which is used to implement and control the present system for dynamic resynchronization of a data storage system after a system failure.

Referring to FIG. 1, a typical data processing system is shown which may function as a basic computer controlled system used in implementing the present invention of the resynchronization of a computer storage system with multiprocessor access to the PV after a system failure. A central processing unit (CPU) 10, such as one of the PC microprocessors or workstations, e.g. RISC System/6000 (RS/6000) (RISC System/6000 is a trademark of International Business Machines Corporation (IBM)) series available from IBM, is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ (AIX 6000 is a trademark of IBM) operating system, available from IBM or any UNIX™ operating system; Microsoft's Windows 95™ or Windows NT(™). It is the operating systems which provide for resynchronization of data storage after a failure. Consequently, the process of the present invention should be incorporated into the operating system for the most advantageous results. However, the present invention should also be operable as an application program ancillary to an operating system.

Application programs 40 and their calls, as controlled by the operating system, are moved into and out of the main random access memory (RAM) 14 and consequently into and out of secondary storage, disk drive 20. As will be subsequently described, the PVs of data dealt within the present invention are stored within disk drive 20. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN); which includes, of course, the Internet. I/O devices are also connected to system bus 12 via user interface adapter 22 and display adapter 36. Keyboard 24 and mouse 26 are all interconnected to bus 12 through user interface adapter 22. It is through such input devices that the user may interactively make calls to application programs. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 2:
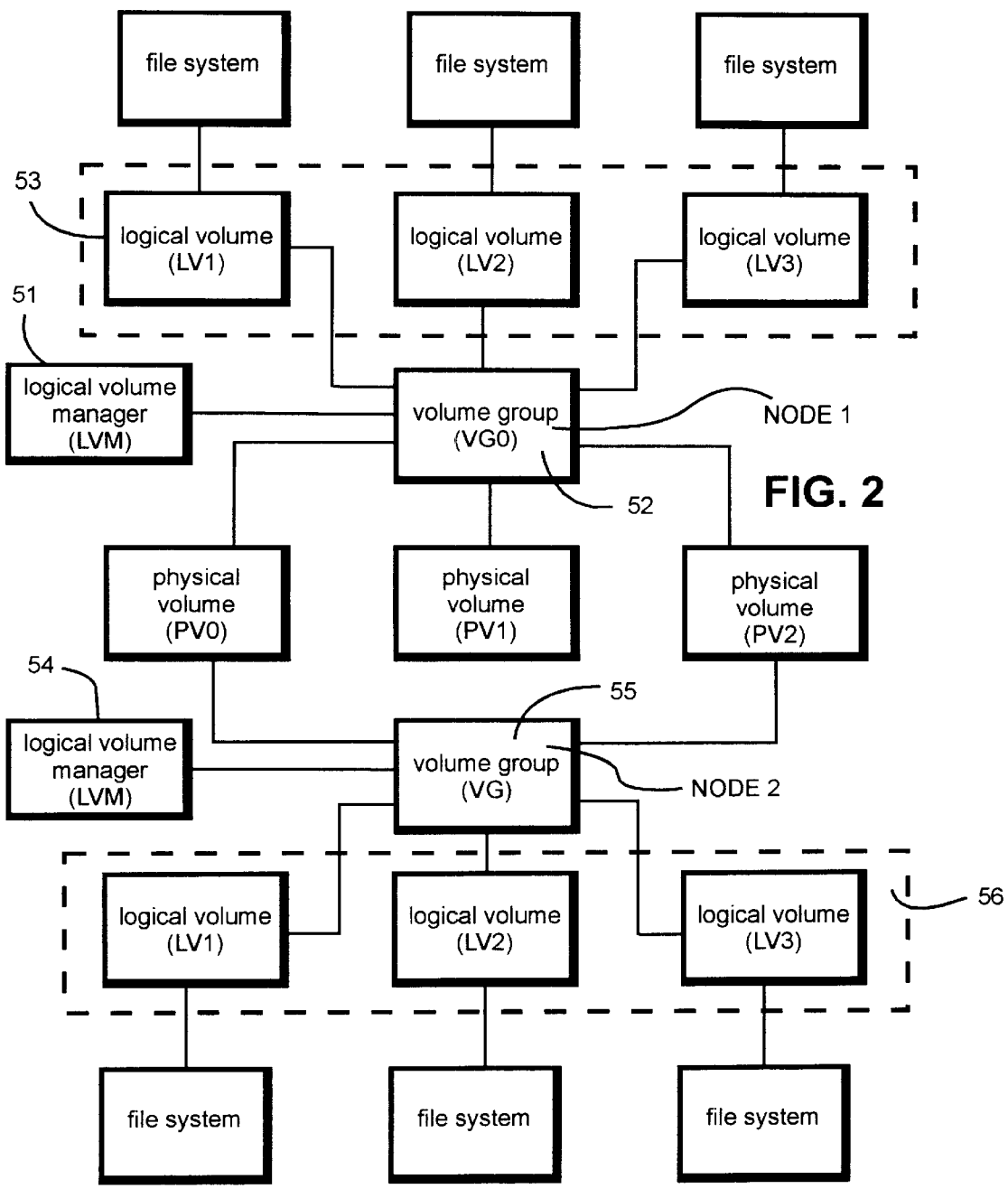
FIG. 2 is a logic diagram of a storage system on which the present invention may be implemented.

Now, with respect to FIG. 2, we will describe the general logic components involved in the multi-initiator or multi-processor access to physical storage volumes of the present invention which are dynamically resynchronized. The logic layer of FIG. 2 is imposed upon the physical storage facilities, e.g. disk drives. Each of the file systems is represented by a LV which is part of a volume group, which is made up of one or more PVs, e.g. the disk drives.

The present system shown is a multi-initiator system in which concurrent files are represented, such as the IBM parallel file mode system. The file systems shown in FIG. 2, as respectively associated with Nodes 1 and 2, constitute such a concurrent mode system. Each node represents one of the initiators or data processors. A volume group 52, 55 for each node is customarily a system-wide logic implement consisting of up to 32 or more PVs of varying size. For example, an AIX system may have up to 255 volume groups. In the present case, the PVs (PV0, PV1 and PV2) are shared. The main purpose of volume groups is to define a structure for the PVs on which the logical volumes exist. In a typical AIX operating system, after installation, the volume groups will be represented by a unitary PV. The root logical volume group, 53 or 56 for each node will normally contain all of the LVs needed to start the data processor system at that node. Each of the PVs is divided into PPs, i.e. equal sized segments of space on the disk drive which are the units of allocation of disk space. PP size is defined at the group level and can be any power of two from 1 to 256 Mbytes. The LVs are the implements by which multiple PPs which are presented to the user and the file system as if they were in one contiguous space. In current data storage systems using mirrored data storage, each LV consists of two or three logical partitions (LPs) containing identical data. These LPs are then stored on corresponding assigned PPs on PVs which of course need not be contiguous or correspond to the LPs in relative positions. Each of the volume groups at each of the nodes has an associated Logical Volume Manager (LVM), 51 and 54 to control LV processing.

The LV data is mirrored data. The mirrored corresponding LV data need not be stored in contiguous or even corresponding positions on the PVs. They may be stored at randomly assigned positions in the disk drives which make up these PVs.

Now, with respect to the flowcharts of FIGS. 3 through 6, we will describe the resynchronization processing of the present invention. For purposes of simplicity of description, we will assume that the mirrored or redundantly stored data is copied once for a total of two copies, with the understanding that the present resynchronization system would be equally applicable to systems with several copies. Also, we will be giving an illustrative example of a multi-initiator system with two nodes, i.e. input/output to two data processing systems. Here too the invention would be equally applicable to parallel systems with the input of several data processing systems.

Also, in the following descriptions, we will note that LVs or partitions in such volumes are in need of recovery. This merely indicates that they must be resynchronized.

Figure 3:
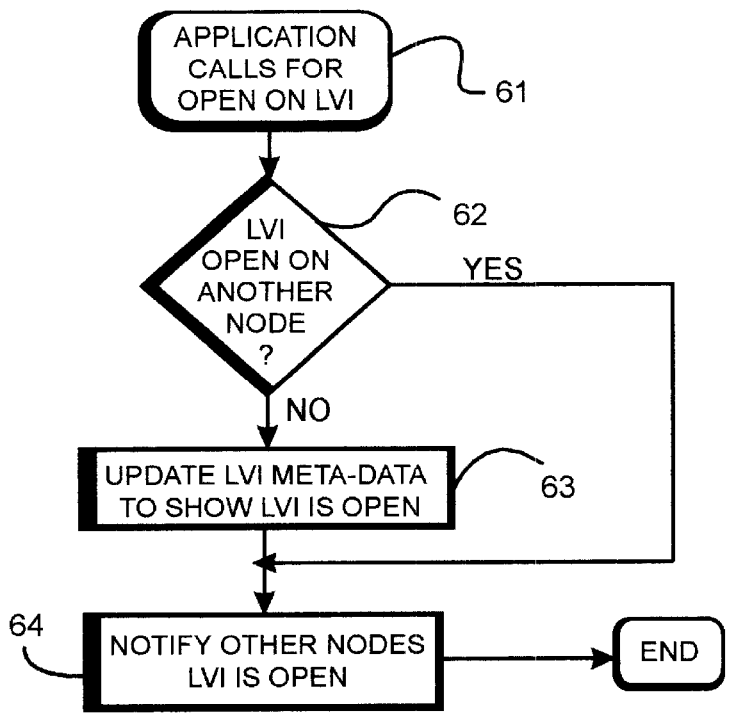
FIG. 3 is a flowchart of the running of a routine for opening a LV at one node in accordance with the present invention.
Figure 4:
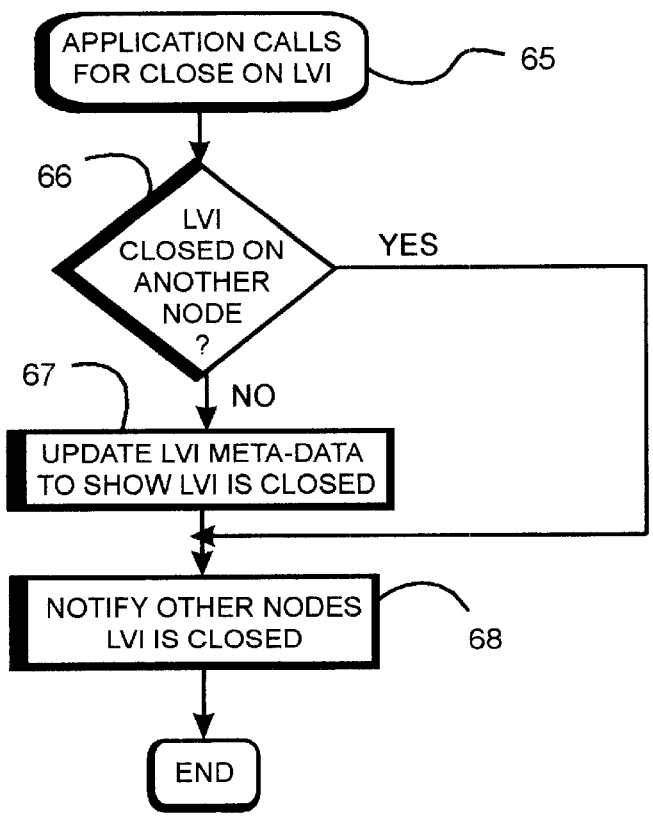
FIG. 4 is a flowchart of the running of a routine for closing a LV at one node in accordance with the present invention.

Now, with reference to FIGS. 3 and 4, we will describe how particular LVs may be open or closed in the multi-initiator systems of the present invention since LVs that are close at the time of a system failure need not be recovered, i.e. resynchronized. Thus, each of the initiators in the multisystem must keep track of all of the open LVs in all of the initiators which are each respectively associated with one of the nodes.

Now, with respect to FIG. 3, let us consider the opening of a LV at one of the initiators/nodes. The operating application calls for an open LV1, step 61. A determination is made, step 62, as to whether LV1 is open on another node. If No, then, step 63, the meta-data, which is stored in a particular portion of the PV to track system conditions is set to indicate that a LV1 is open. If the determination from step 62 is Yes, which indicates that an LV1 has already been open in the system, and, thus, the meta-data has already been set to indicate this, then the process proceeds to step 64; which in either case, notifies the other nodes in the system that this particular LV1 is open. It should be noted that this step is needed because, while the above meta-data step tracks whether any LV1 in the system is open, it is still necessary for the individual nodes to be aware of which individual LVs are open and, thus, need resynchronization. Then, the process is ended.

FIG. 4 describes the close of a LV at one of the initiators/nodes. The operating application calls for a close on LV1, step 66. A determination is made, step 66, as to whether LV1 is closed on another node. If No, then, step 67, the meta-data which is stored in the PV is set to indicate that a LV1 is closed. If the determination from step 66 is Yes, which indicates that an LV1 has already been closed in the system, and, thus, the meta-data has already been set to indicate this, then the process proceeds to step 68; which, in either case, notifies the other nodes in the system that this LV1 is closed and the close process is at an end.

Figure 5:
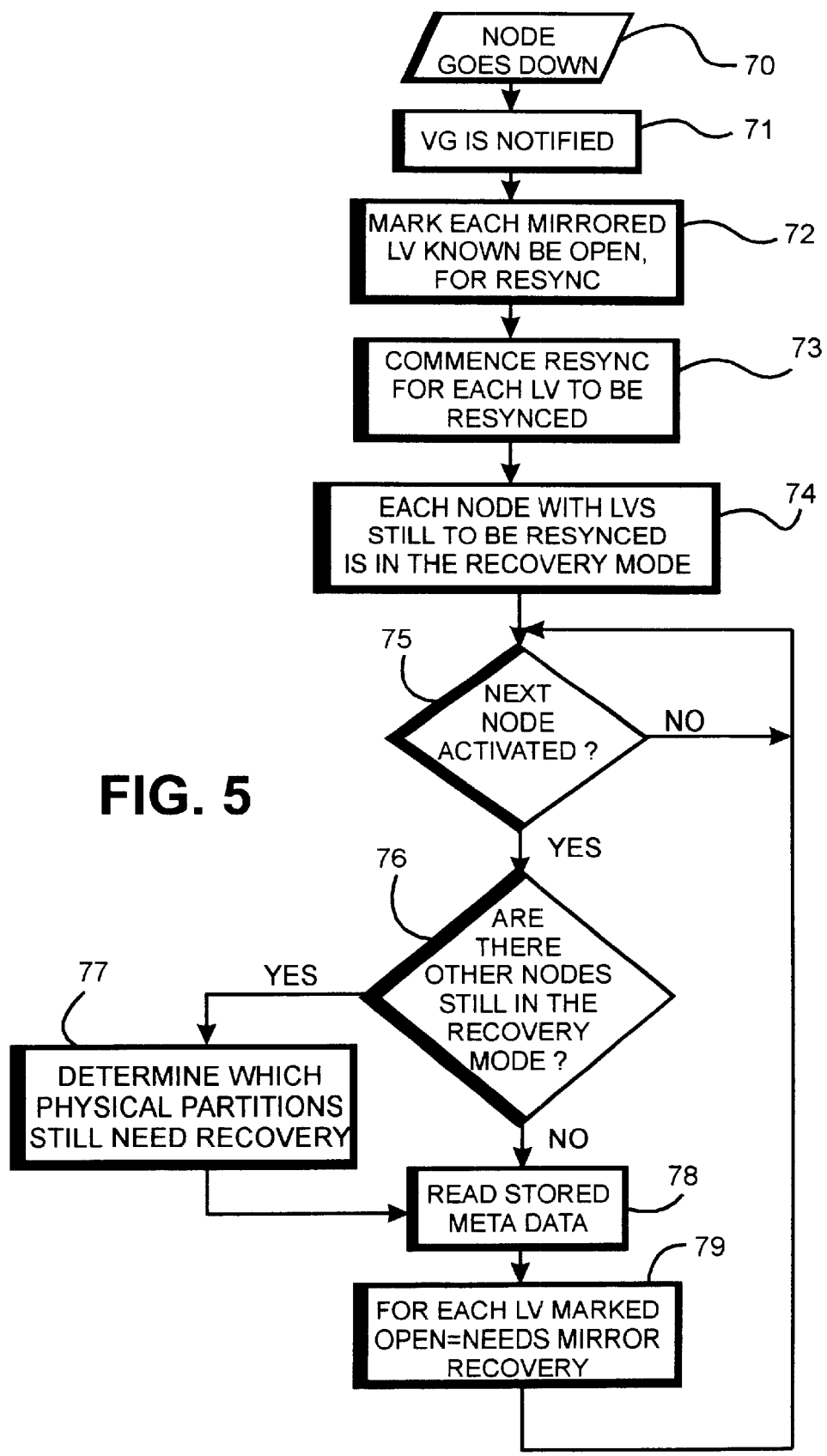
FIG. 5 is a flowchart of the present process for setting up for recovery (resychronization) in a multi-node system after a failure at one of the nodes.

Now, with respect to FIG. 5, we will describe what happens throughout the multi-initiator system when the system at one of the nodes goes down, i.e. fails, step 70. First, the associated volume group (VG) is notified, step 71. Each of the LVs known to be open is marked for recovery, i.e. resynchronization, step 72. Then, step 73, the resynchronization is commenced for each LV which is open. Each node with open LVs which have not as yet been resynchronized is considered to be in the recovery mode, step 74. Since the system is dynamic, i.e. the systems at the nodes are reactivated after a failure before resynchronization is completed, a determination is made, step 75, as to whether a node has been activated. If No, then the process is looped back to step 75, and the activation of a node is awaited. If Yes, the node is activated, then a determination is made in step 76 as to whether there are other nodes still in the recovery mode, i.e. they have not, as yet, been resynchronized. If Yes, then the process determines from the LVMs associated with the respective VGs at the nodes still in the recovery mode which PPs are still in need of recovery, step 77. In the multi-initiator system being described, when a LP in a LV is resynchronized, then its corresponding PP is also resynchronized. Thus, that PP will already be resynchronized when its corresponding LP in a LV at a node subsequently undergoing recovery is reached, and, consequently, that LP will not have to be resynchronized. Then, step 78, the previously described meta-data is read as to which LVs at the activated node are marked open, and those LVs will need to be resynchronized, step 79, after which the process will await the next node to be activated at step 75.

Figure 6:
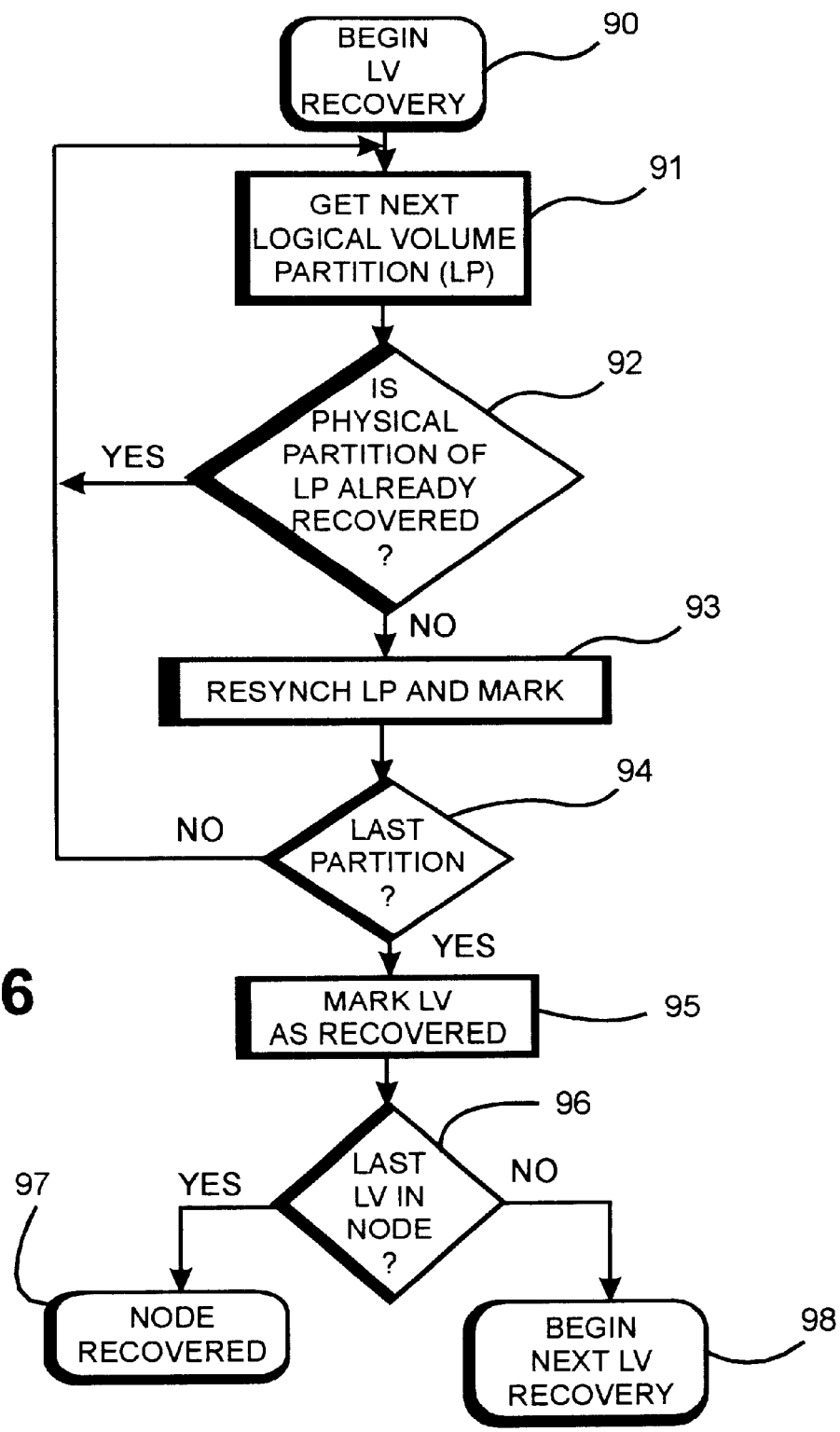
FIG. 6 is a flowchart of the running of the resynchronization program of this invention in the recovery of a LV.

Now, with respect to FIG. 6, there will be described how a LV noted for recovery in step 79 of FIG. 5 will be recovered or resynchronized commencing with step 90. The first or next LV partition is obtained, step 91, and a determination is made, step 92, as to whether the PP which corresponds to this LP has already been resynchronized or recovered in connection with a previously resynchronized LP from a LV in a previously recovered node. If Yes, then since its PP is already resynchronized, the LP is already recovered and need not be resynced again. Thus, the process is returned to step 91, and the next LP is obtained. If the decision from step 92 is No, the LP is resynchronized and marked as recovered, step 93. Then, step 94, a determination is made as to whether the last partition in the LV has been reached. If No, then the process is returned to step 91, and the next LP is obtained, and the above procedure is continued until the decision from step 94 is Yes, the last partition has been processed. Then, the LV is marked as recovered, step 95, and a determination is made as to whether the last LV in the activated node has been processed, step 96. If Yes, then the node is marked as recovered, step 97. If No, then the next LV in the activated node is obtained and its recovery is commenced with step 90 above.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a data processor controlled storage system for storing data in a physical volume having a plurality of physical partitions, means for accessing said physical data volume through a plurality of nodes,
each node having at least one logical data volume comprising mirrored data corresponding to a logical data volume comprising mirrored data at each of the other nodes, and wherein data in corresponding logical volumes is represented by data stored in common in said physical volume, and
means for resynchronizing the logical data volumes of each of said nodes in the event of a storage system failure at one of said nodes comprising:
means for commencing the sequential resynchronization of a logical data volume at a nonfailure node to thereby sequentially resynchronize the partitions of said physical data volume representative of said logical data volume, and
means for indicating as resynchronized those portions of the logical data volume at said failure node represented by said resynchronized partitions of said physical data volume.

2. The data processor storage system of claim 1 wherein logical data volumes of said nodes may be open or closed and only open logical data volumes are resynchronized.

3. The data processor storage system of claim 1 wherein each of said logical data volumes comprises a plurality of partitions of mirrored data respectively represented by said physical data volume partitions.

4. The data processor storage system of claim 3 further including means for commencing the sequential resynchronization of a logical data volume at the failure node subsequent to the commencing of the sequential resynchronization of the logical data volume at the nonfailure node.

5. The data processor storage system of claim 3 wherein said means for indicating as resynchronized comprise:
means responsive to said failure for setting resynchronization indicators for the logical volume at the failure node and for the corresponding logical volumes at the nonfailure nodes, and
means for removing said resynchronization indicator from the partitions of the logical data volume at said failure node represented by said resynchronized partitions of said physical data volume.

6. In a data processor controlled storage system for storing data in a physical volume having a plurality of physical partitions, and means for accessing said physical data volume through a plurality of nodes, each node having at least one logical data volume comprising mirrored data corresponding to a logical data volume comprising mirrored data at each of the other nodes, and wherein data in corresponding logical volumes is represented by data stored in common in said physical volume, a method of resynchronizing the logical data volumes of each of said nodes in the event of a storage system failure at one of said nodes comprising:

commencing the sequential resynchronization of a logical data volume at a nonfailure node to thereby sequentially resynchronize the partitions of said physical data volume representative of said logical data volume, and indicating as resynchronized those portions of the logical data volume at said failure node represented by said resynchronized partitions of said physical data volume.

7. The resynchronization method of claim 6 wherein logical data volumes of said nodes may be open or closed and only open logical data volumes are resynchronized.

8. The resynchronization method of claim 6 wherein each of said logical data volumes comprises a plurality of partitions of mirrored data respectively represented by said physical data volume partitions.

9. The resynchronization method of claim 8 further including the step of commencing the sequential resynchronization of a logical data volume at the failure node subsequent to the commencing of the sequential resynchronization of the logical data volume at the nonfailure node.

10. The resynchronization method of claim 8 wherein said step of indicating as resynchronized comprises the steps of:
setting resynchronization indicators for the logical volume at the failure node and for the corresponding logical volumes at the nonfailure nodes responsive to said failure, and
removing said resychronization indicator from the partitions of the logical data volume at said failure node represented by said resynchronized partitions of said physical data volume.

11. In a data processor controlled storage system for storing data in a physical volume having a plurality of physical partitions, and means for accessing said physical data volume through a plurality of nodes, each node having at least one logical data volume comprising mirrored data corresponding to a logical data volume comprising mirrored data at each of the other nodes, and wherein data in corresponding to a logical volumes is represented by data stored in common in said physical volume, a computer readable medium including a computer program having program code thereon for resynchronizing the logical data volumes of each of said nodes in the event of a storage system failure at one of said nodes comprising:
means for commencing the sequential resynchronization of a logical data volume at a nonfailure node to thereby sequentially resynchronize the partitions of said physical data volume representative of said logical data volume, and
means for indicating as resynchronized those portions of the logical data volume at said failure node represented by said resynchronized partitions of said physical data volume.

12. The computer readable medium of claim 11 wherein the computer program code wherein logical data volumes of said nodes may be open or closed and only open logical data volumes are resynchronized.

13. The computer readable medium of claim 11 wherein the computer program code where in each of said logical data volumes comprises a plurality of partitions of mirrored data respectively represented by said physical data volume partitions.

14. The computer readable medium of claim 13 wherein the computer program code further including means for commencing the sequential resynchronization of a logical data volume at the failure node subsequent to the commencing of the sequential resynchronization of the logical data volume at the nonfailure node.

15. The computer readable medium of claim 13 wherein the computer program code wherein said means for indicating as resynchronized comprise:

means responsive to said failure for setting resynchronization indicators for the logical volume at the failure node and for the corresponding logical volumes at the nonfailure nodes, and means for removing said resynchronization indicator from the partitions of the logical data volume at said failure node represented by said resynchronized partitions of said physical data volume.

* * * * *